C. F. HESS.
WIND SHIELD VENTILATOR BRACKET.
APPLICATION FILED APR. 20, 1914.
1,160,170.                                   Patented Nov. 16, 1915.
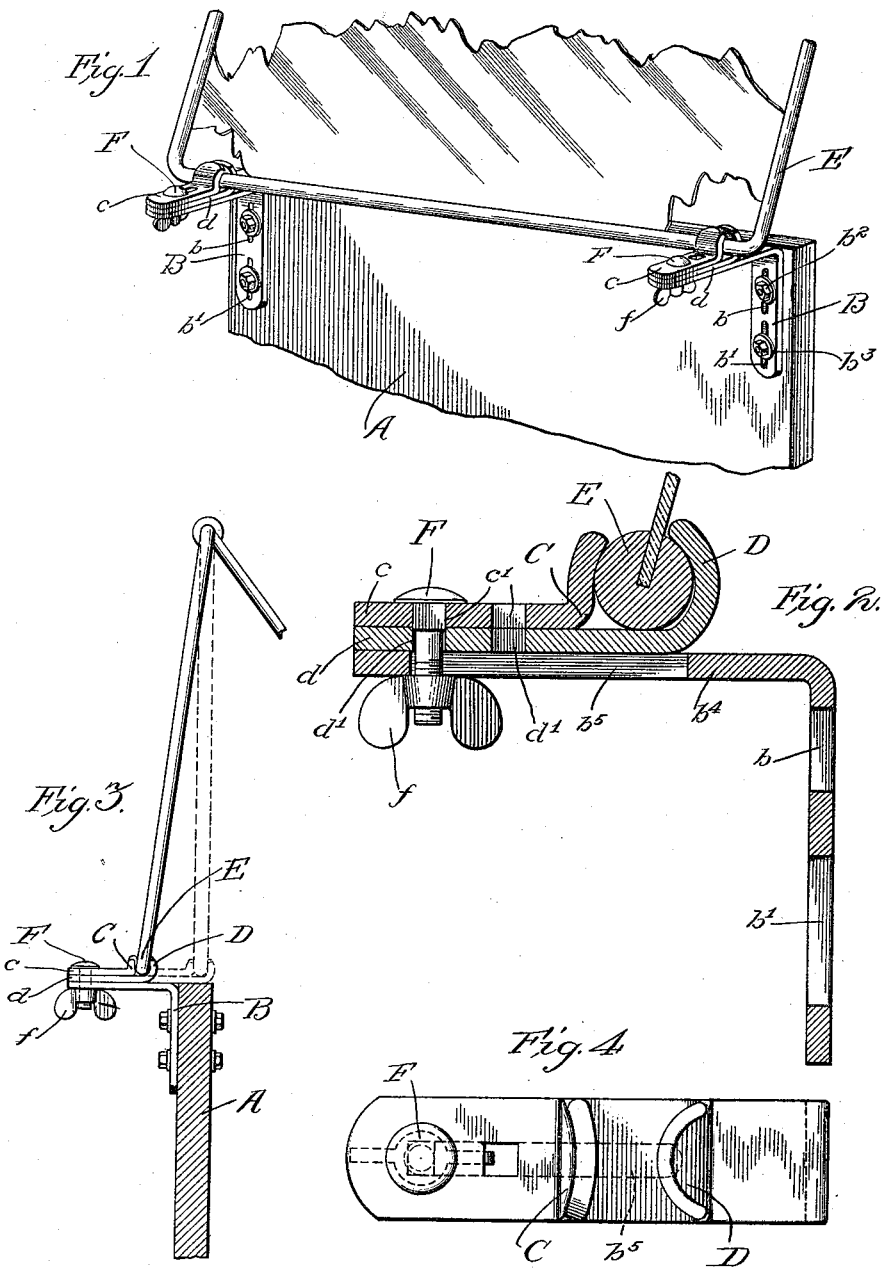
Witnesses:
Arthur H. Carlson
Stephen Rebora
Inventor
Christian F. Hess
By Arthur F. Durand
Atty.
COLUMBIA PLANOGRAPH CO., WASHINGTON, D. C.

UNITED STATES PATENT OFFICE.

CHRISTIAN F. HESS, OF CHICAGO, ILLINOIS, ASSIGNOR TO ALEXANDER NELSON, OF CHICAGO, ILLINOIS.

WIND-SHIELD VENTILATOR-BRACKET.

1,160,170.  Specification of Letters Patent.  Patented Nov. 16, 1915.

Application filed April 20, 1914. Serial No. 833,019.

*To all whom it may concern:*

Be it known that I, CHRISTIAN F. HESS, a citizen of the United States of America, and resident of Chicago, Cook county, Illinois, have invented a certain new and useful Improvement in Wind-Shield Ventilator-Brackets, of which the following is a specification.

My invention relates to wind shields or similar devices for automobiles or other vehicles.

Generally stated, the object of my invention is to provide a supporting bracket having means whereby the lower edge of the wind shield can be moved inward to form a ventilating opening.

It is also an object to provide certain details of construction and combinations tending to increase the general efficiency and desirability of a wind shield supporting bracket of this particular character.

To the foregoing and other useful ends my invention consists in matters hereinafter set forth and claimed.

In the accompanying drawings—Figure 1 is a perspective showing an automobile dash provided at its upper edge with a wind shield mounted on a pair of supporting brackets embodying the principles of my invention. Fig. 2 is an enlarged section of one of said brackets. Fig. 3 is a side elevation of the structure shown in Fig. 1. Fig. 4 is a plan of the device shown in Fig. 2.

As thus illustrated, the dash A of the automobile is provided on its rear surface, adjacent the outer and upper corners thereof, with a pair of L-shaped or angle brackets B, and as these two brackets are similar in character a description of one will be sufficient. The vertical portion of the bracket is provided with vertical slots $b$ and $b^1$ through which the bolts $b^2$ and $b^3$ extend, whereby the bracket is supported for vertical adjustment on the dash. The upper horizontal portion $b^4$ of the bracket is provided with a longitudinal slot $b^5$, and is of a length to support the two jaws C and D in various positions. The jaw C has a straight horizontal portion $c$ provided with bolt openings $c^1$, and the jaw D has a similar horizontal portion $d$ provided with bolt openings $d^1$, the openings of these upper and lower portions $c$ and $d$ registering in the manner shown. The jaws C and D are formed to grip the cylindric lower edge E of the wind shield, which latter can be of any suitable character. The bolt F extends downward through the openings $c^1$ and $d^1$, through the slot $b^5$ and is provided at its lower end with a thumb nut $f$ whereby the two jaws can be clamped tightly in place in different positions along the length of said slot. If desired, the said bolt can have its upper portion squared, for any suitable distance, whereby it cannot turn in the openings $c^1$, the latter being square; or if necessary or preferable, the square portion of the bolt can extend downward through the square openings $d^1$, and also into the slot $b^5$, thereby absolutely preventing rotation of the bolt in the structure thus formed by the bracket and the two jaws.

With this construction and arrangement the lower edge of the wind shield can be moved backward, as shown in Figs. 1 and 3, thereby producing an opening between the lower edge of the shield and the upper edge of the dash. In this way, a simple provision is made for taking air into a closed car, by simply adjusting the wind shield in the manner explained. The clamping device comprising the jaws C and D can be adjusted to different positions along the top of the bracket, whereby the size of the ventilating opening can be varied at will.

The adjustment can be effected without releasing the lower edge of the shield, as even when the nut $f$ is loosened the shield is still held and cannot become disconnected during the adjustment.

The said wind shield is, of course, in the nature of a window, and it is obvious, therefore, that my invention is not necessarily limited to this particular use, but may be used with other windows and for other purposes.

I do not limit myself to the exact construction shown and described.

What I claim as my invention is—

1. A wind shield ventilator bracket comprising a member for attachment to a dash or other support, devices for adjusting the lower edge of the shield relative to the upper edge of said support, to admit or exclude the air, and means for attaching said member in position, said devices comprising a pair of separable jaws for engaging the edge of the shield, and means including a single clamping bolt whereby said jaws are movable horizontally in unison along said member and securable in different positions thereon.

2. A wind shield ventilator bracket comprising a member for attachment to a dash or other support, devices for adjusting the lower edge of the shield relative to the upper edge of said support, to admit or exclude the air, and means for attaching said member in position, said member being L-shaped and provided with a horizontal slot, said devices comprising a pair of jaws for engaging the edge of the shield, each jaw consisting of a flat strip with its end upturned, said strips disposed one on top of the other, upon the said L-shaped member, and a bolt extending vertically through said strips and slot, said strips each having a plurality of holes for said bolt, said member being adjustable up and down.

3. A wind shield ventilator bracket comprising a member for attachment to a dash or other support, devices for adjusting the lower edge of the shield relative to the upper edge of said support, to admit or exclude the air, and means for attaching said member in position, said devices including a pair of upturned jaws having horizontal portions disposed one upon the other, on the top of said member, and a bolt extending through the three-ply thickness formed by said portions and member, the upper portion of said member having means whereby said bolt and jaws may have different positions thereon.

4. A wind shield ventilator bracket comprising a member for attachment to a dash or other support, devices for supporting the shield upon but out of contact with said member, having provisions for adjusting the lower edge of the shield relative to the upper edge of said support, to admit or exclude the air, and means for attaching said member in position, said member having a horizontal slot, and a bolt extending through said slot, having a nut for holding said devices in different positions along the length of said slot, said devices including a plurality of separable parts which are held together by said bolt.

5. A wind shield ventilator bracket comprising a member for attachment to a dash or other support, devices for adjusting the lower edge of the shield relative to the upper edge of said support, to admit or exclude the air, and means for attaching said member in position, said devices having a vertically disposed fastening bolt, and said devices having holes for said bolt, which holes are formed to prevent rotation of said bolt therein, and a clamping nut for said bolt, said devices including a pair of separable jaws held against relative displacement by said bolt.

6. A wind shield ventilator bracket comprising a supporting member for attachment to a dash or other support, superimposed strips resting on said member, said strips having upturned ends for engaging the lower edge of the shield, and means for adjustably holding said strips on said member.

7. A wind shield ventilator bracket comprising a supporting member for attachment to a dash or other support, superimposed strips resting on said member, said strips having upturned ends for engaging the lower edge of the shield, and means for adjustably holding said strips on said member, said means including a vertical bolt extending through the three-ply thickness formed by said member and strips, and a slot for said bolt in said member.

8. A wind shield ventilator bracket comprising a supporting member for attachment to a dash or other support, superimposed strips resting on said member, said strips having upturned ends for engaging the lower edge of the shield, and means for adjustably holding said strips on said member, said strips each having a plurality of holes, and said means including a bolt for said holes.

9. A wind shield ventilator bracket comprising a supporting member for attachment to a dash or other support, devices on said member to rigidly grip and hold the lower edge of said shield, and means whereby said devices are adjustable back and forth on said member without releasing the lower edge of the shield, thereby to change the angle of the shield, said member having a slot, and said devices having a single bolt movable back and forth in said slot.

Signed by me at Chicago, Illinois, this 8th day of April, 1914.

CHRISTIAN F. HESS.

Witnesses:
RACHEL J. RICHARDSON,
ROSE E. SEHNEM.

Copies of this patent may be obtained for five cents each, by addressing the "Commissioner of Patents, Washington, D. C."